United States Patent
Weeter et al.

(10) Patent No.: US 10,995,801 B2
(45) Date of Patent: May 4, 2021

(54) METHOD FOR PRODUCING AN AUTOMOTIVE FRICTION MATERIAL WITH OPTIMIZED MULTI DIMENSIONAL CONSTRUCTION

(71) Applicant: GM Global Technology Operations LLC, Detroit, MI (US)

(72) Inventors: Greg A. Weeter, Ann Arbor, MI (US); Timothy M. Anguish, Whitmore Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/590,695

(22) Filed: Oct. 2, 2019

(65) Prior Publication Data
US 2020/0032857 A1 Jan. 30, 2020

Related U.S. Application Data

(63) Continuation of application No. 16/042,256, filed on Jul. 23, 2018, now abandoned.

(51) Int. Cl.
| | | |
|---|---|---|
| *F16D 13/00* | (2006.01) | |
| *F16D 65/00* | (2006.01) | |
| *D06N 3/00* | (2006.01) | |
| *D06M 23/00* | (2006.01) | |
| *C09J 5/00* | (2006.01) | |
| *F16D 13/64* | (2006.01) | |
| *B05D 7/24* | (2006.01) | |
| *B05D 1/02* | (2006.01) | |
| *D06M 23/16* | (2006.01) | |
| *D06M 23/08* | (2006.01) | |
| *D06M 101/40* | (2006.01) | |

(52) U.S. Cl.
CPC .............. *F16D 13/64* (2013.01); *B05D 1/02* (2013.01); *B05D 7/24* (2013.01); *C09J 5/00* (2013.01); *D06M 23/08* (2013.01); *D06M 23/16* (2013.01); *D06N 3/0006* (2013.01); *D06M 2101/40* (2013.01); *D06N 2201/087* (2013.01); *D06N 2209/106* (2013.01); *F16D 2250/0023* (2013.01); *F16D 2250/0046* (2013.01); *F16D 2250/0069* (2013.01)

(58) Field of Classification Search
None
See application file for complete search history.

(56) References Cited

U.S. PATENT DOCUMENTS 4,260,047 A * 4/1981 Nels ...................... F16D 13/648
188/251 A
5,775,468 A * 7/1998 Lam ...................... F16D 69/026
188/251 A

* cited by examiner

*Primary Examiner* — Linda L Gray (57) ABSTRACT

A method for producing an automotive friction material with optimized multi-dimensional construction includes receiving a base friction-disc material, cutting the base friction-disc material to a predetermined size and shape, assembling the sized and shaped cut base friction-disc material, bonding the base friction-disc material to a base friction plate, and utilizing a multi nozzle printing array to deposit friction enhancing materials overtop a reaction surface of the base friction-disc material.

12 Claims, 4 Drawing Sheets

METHOD FOR PRODUCING AN AUTOMOTIVE FRICTION MATERIAL WITH OPTIMIZED MULTI DIMENSIONAL CONSTRUCTION

CROSS-REFERENCE TO RELATED APPLICATIONS

This application is a continuation patent application of U.S. patent application Ser. No. 16/042,256, filed Jul. 23, 2018, the contents of which are incorporated by reference herein in their entirety.

INTRODUCTION

The statements in this section merely provide background information relating to the present disclosure, and may not constitute prior art.

The present disclosure relates to motor vehicles, and more specifically to methods of producing friction materials used in motor vehicle transmission components. Friction materials are used in a variety of locations within motor vehicles, and in particular in transmission components such as clutches, synchronizers, torque converter clutches, and multi-plate clutch packs. Each of the clutch disks and/or synchronizers used in a motor vehicle transmission is typically constructed of fibrous materials, some form of resinous material, and additives. The quantities and proportions of the additives can be used to modify wear, friction, and thermal properties of the clutch disks and/or synchronizers, depending on the application for which the clutch disks and/or synchronizers are designed. As transmission technologies have advanced, to provide more rapid and smoother shifts between gears, tolerances of the transmission components have become more important to the design and construction of the transmission. Moreover, the complexity of the transmission and of transmission components has increased. As a result, while traditional methods for depositing fibrous material, resinous material and additives are effective for their intended purpose, there is a need in the art for new and improved methods of producing automotive friction materials that more accurately control the multi-dimensional distribution of fibrous material, resin, and additives over the clutch disks and/or synchronizers, while decreasing manufacturing complexity and costs.

SUMMARY

According to several aspects a method for producing an automotive friction material with optimized multi-dimensional construction includes receiving a base friction-disc material, cutting the base friction-disc material to a predetermined size and shape, assembling the sized and shaped cut base friction-disc material, bonding the base friction-disc material to a base friction plate, and utilizing a multi nozzle printing array to deposit friction enhancing materials overtop a reaction surface of the base friction-disc material.

In another aspect of the present disclosure receiving the base friction-disc material further includes receiving a continuous roll or flattened stock forming the base friction-disc material.

In another aspect of the present disclosure the base friction-disc material is a woven material.

In another aspect of the present disclosure the base friction material is a composite material.

In another aspect of the present disclosure cutting the base friction-disc material further includes utilizing a die to cut interlocking arcuate segments or annular rings of base friction-disc material from the base friction-disc material.

In another aspect of the present disclosure assembling the sized and shaped cut base friction-disc material further includes connecting interlocking arcuate segments to form complete annular rings of base friction-disc material.

In another aspect of the present disclosure bonding the base friction-disc material to the base friction plate further includes injecting a bonding material between the base friction-disc material and the base friction plate.

In another aspect of the present disclosure utilizing a multi nozzle print array further includes providing a supply of a plurality of friction enhancing materials to nozzles of the print array, wherein the plurality of friction enhancing materials include friction modifiers and resins.

In another aspect of the present disclosure utilizing a multi nozzle print array further includes depositing structural resin to precise predetermined locations on the base friction-disc material in a high density linear printing process or a translational printing process.

In another aspect of the present disclosure a method for producing an automotive friction material with optimized multi-dimensional construction further includes dynamically adjusting material properties of the friction enhancing materials as the multi nozzle print array deposits the friction enhancing materials on the reaction surface of the base friction-disc material.

In another aspect of the present disclosure dynamically adjusting material properties of the friction enhancing materials further includes actively and dynamically controlling a duration of deposition, a viscosity, a density, and a flow speed or flow rate of the friction enhancing materials through the multi nozzle print array.

In another aspect of the present disclosure utilizing a multi nozzle print array to deposit friction enhancing materials overtop a reaction surface of the base friction-disc material further includes dynamically adjusting a depth of the friction enhancing materials as the friction enhancing materials are deposited on the base friction-disc material.

In another aspect of the present disclosure a method for producing an automotive friction material with optimized multi-dimensional construction includes receiving a continuous roll or flattened stock base friction-disc material composed of a woven carbon material or a composite material, cutting the base friction-disc material to a predetermined size and shape, the predetermined size and shape being interlocking arcuate segments or annular rings of base friction-disc material cut from the base friction-disc material, and utilizing a multi nozzle printing array to deposit friction enhancing materials overtop a reaction surface of the base friction-disc material at precise locations on the base friction-disc material.

In another aspect of the present disclosure a method for producing an automotive friction material with optimized multi-dimensional construction further includes assembling the annular rings or assembling the interlocking arcuate segments to form annular ring, and utilizing a bonding material between the annular rings of base friction-disc material and a base friction plate to permanently bond the annular rings of base friction-disc material to the base friction plate.

In another aspect of the present disclosure utilizing a multi nozzle print array further includes providing a supply of a plurality of friction enhancing materials to nozzles of the print array, wherein the plurality of friction enhancing materials include friction modifiers and resins.

In another aspect of the present disclosure utilizing a multi nozzle print array further includes depositing a structural resin at precise predetermined locations on the base friction-disc material in a high density linear printing process or a translational printing process, and dynamically adjusting a duration of deposition, a viscosity, a density, a flow speed or flow rate, and a material composition of the friction enhancing materials as the multi nozzle print array deposits the friction enhancing materials on the base friction-disc material.

In another aspect of the present disclosure a method for producing an automotive friction material with optimized multi-dimensional construction further includes dynamically adjusting a depth of the friction enhancing materials as the friction enhancing materials are deposited on the base friction-disc material.

In another aspect of the present disclosure utilizing a multi nozzle print array further includes depositing a structural resin into joints between interlocking arcuate segments of base friction-disc material.

In another aspect of the present disclosure a method for producing an automotive friction material with optimized multi-dimensional construction includes receiving a continuous roll or flattened stock base friction-disc material composed of a woven carbon material or a composite material, cutting the base friction-disc material to a predetermined size and shape, the predetermined size and shape being interlocking arcuate segments or annular rings of base friction-disc material cut from the base friction-disc material, bonding the annular rings to a base friction plate, or assembling the interlocking arcuate segments to form annular rings and bonding the resulting annular rings to the base friction plate by utilizing a bonding material between the annular rings of base friction-disc material and the base friction plate to permanently bond the annular rings of base friction-disc material to the base friction plate, providing a supply of a plurality of friction enhancing materials to nozzles of a multi nozzle print array, wherein the plurality of friction enhancing materials include friction modifiers and resins, utilizing the multi nozzle printing array to deposit a structural resin at precise predetermined locations on the base friction-disc material in a high density linear printing process or a translational printing process, and dynamically adjusting a duration of deposition, a viscosity, a density, a flow speed or flow rate, and a material composition of the friction enhancing materials as the multi nozzle print array deposits the friction enhancing materials on the base friction-disc material, and dynamically adjusting a depth of the friction enhancing materials as the friction enhancing materials are deposited on the base friction-disc material. The multi nozzle printing array deposits friction enhancing materials overtop a reaction surface of the base friction-disc material.

In another aspect of the present disclosure utilizing a multi nozzle print array further includes depositing a structural resin into joints between interlocking arcuate segments of base friction-disc material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Friction-disc clutch mechanisms are commonly used at a variety of locations throughout a motor vehicle's powertrain to transfer motive power between a driving shaft and a driven shaft. The operation of such clutch mechanisms generally includes pressing together a pair of opposed clutch plates in which one plate has a high-friction contact surface and the other plate has a relatively smooth contact surface. The forceful engagement between the high friction plate and the smooth plate interlocks the plates together and causes both plates to rotate in unison to achieve a desired power transfer. Under certain clutch operating conditions, however, the constant engagement and disengagement of the plates can be approximated by a stick-slip phenomenon in which the plates skid against one another as opposed to cleanly and crisply engaging and disengaging. Such stick-slip situations are commonly referred to as clutch shudder. To address this, and other related issues, such as wear and noise, a multi-layer coating for application to at least a smooth plate surface of a friction-disc clutch mechanism has been developed. FIGS. 1A-4B illustrate a series of examples of such a friction-disc generally shown and indicated by reference number 10. Each of the examples of FIGS. 1A-4B can be produced as an arcuate segment of the friction-disc 10.

However, in some examples the friction-disc 10 is formed as a complete annular disc 11 without interruption, while in other examples, the friction-disc 10 is formed of a series of interlocking arcuate segments in fixed engagement with one another.

Figures 1A, 1B:
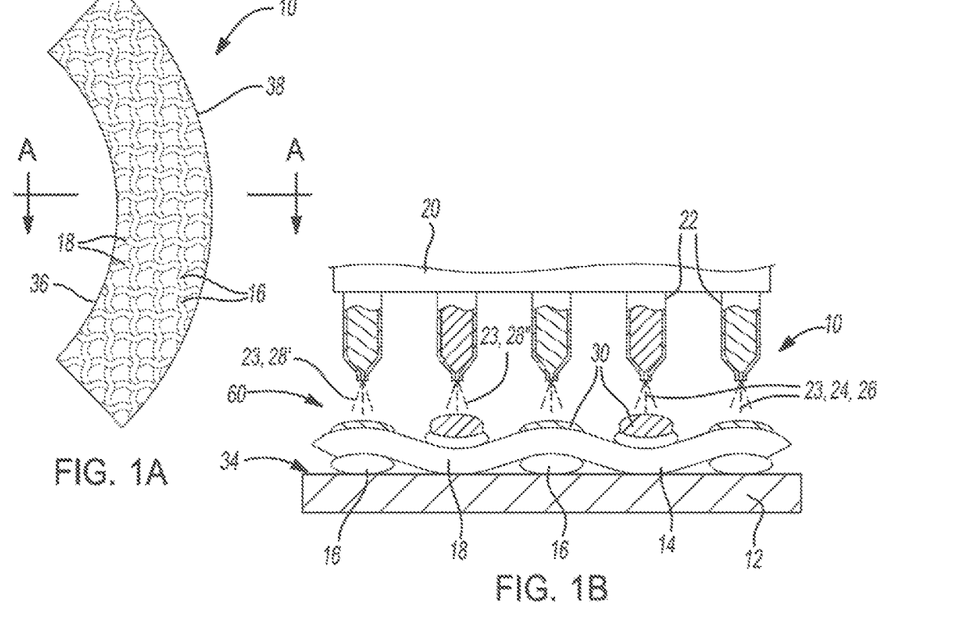
FIG. 1A is a plan view of a segment of a clutch disk manufactured according to an aspect of the present disclosure.
FIG. 1B is a cross sectional view of the segment of clutch disk of FIG. 1A taken across line A-A and shown during a manufacturing step of the method according to an aspect of the present disclosure.
Figure 1C:
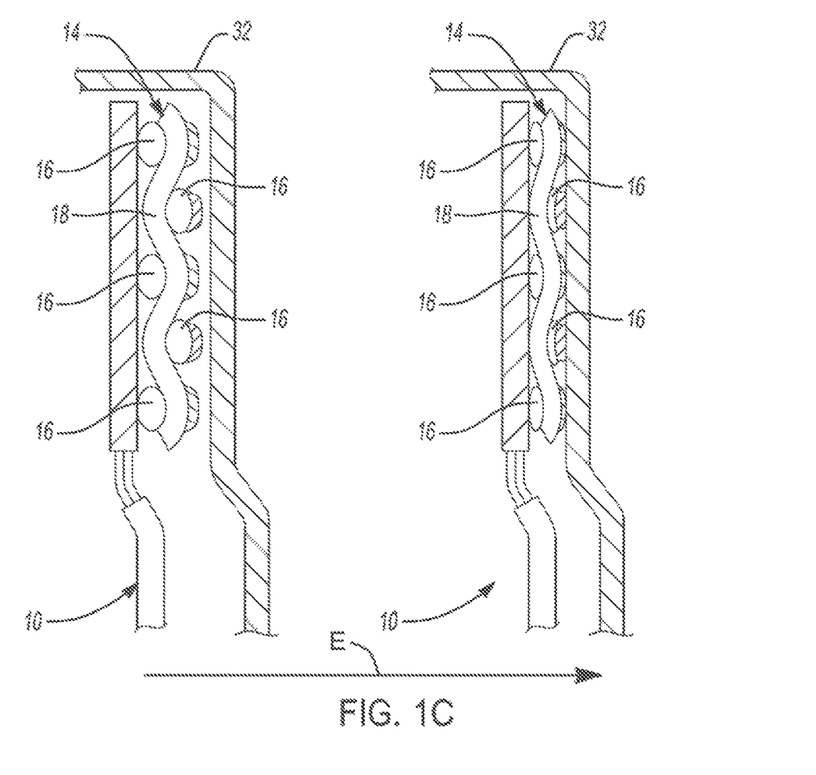
FIG. 1C is a partial cross sectional depiction of the clutch disk of FIG. 1A taken across line A-A and shown in use in a motor vehicle transmission according to an aspect of the present disclosure.

FIGS. 1A-1C, do not expressly depict an automatic transmission or a manual transmission clutch assembly, however, an automatic transmission torque converter clutch of the variety shown in FIGS. 1A-1C would be a single-plate design. However, it should be appreciated that multiple plate torque converter clutches and/or multiple-plate manual transmission clutches may include substantially the same components as described herein without departing from the scope or intent of the present disclosure.

In the example of FIGS. 1A-1C, a segment of a friction-disc 10 according to an aspect of the present disclosure is shown. The friction-disc 10 is a substantially planar, annular disc 11 composed of a plurality of layers. A base friction plate 12 forms a base portion of the friction-disc 10. The base friction plate 12 is relatively rigid and composed of a metallic compound such as steel. The base friction plate 12 may in some instances, however, allow a predetermined amount of bending or deflection according to the design requirements of the particular powertrain location in which the friction-disc 10 is to be used. The base friction plate 12 supports a base layer 14. In several aspects, the base layer 14 is composed of fibrous materials, such as carbon fibers or the like. The fibrous materials are used in a variety of forms, such as a woven carbon fabric. In the example of FIGS. 1A-1C, the woven carbon fabric of the base layer 14 is shown as having a substantially orthogonal or "square" weave having first carbon fibers 16 woven orthogonally with second fibers 18. While the exemplary woven carbon fabric of FIGS. 1A-1C is square-woven, it should be understood that depending on the application, cost constraints, and desirable frictional characteristics may dictate that the woven carbon fabric may have other woven patterns such as twill, satin, basket weave, jacquard, dobby, leno, or the like without departing from the scope or intent of the present disclosure. However, while the woven carbon fabric of the base layer 14 may provide coefficients of friction in some applications, in other applications it is desirable to increase, decrease, or otherwise modify the coefficient of friction of the carbon fabric of the base layer 14.

Accordingly, FIG. 1B depicts a cross section of FIG. 1A taken across line A-A during a manufacturing step. During production a multi-nozzle print head or print array 20 deposits a plurality of additives 24 overtop the base layer 14. The print array 20 is a high density linear print head capable of print, injecting, or otherwise depositing the plurality of additives 24 either simultaneously, or sequentially. The print array 20 has a plurality of nozzles 22 in fluid communication with at least one pump (not shown) and an additive 24 reservoir (not shown). The print array 20 is both mechanically and digitally controlled. That is, the print array 20 includes a plurality of mechanical features such as pumps, valves, and the like (not shown). Moreover, the print array 20 includes a plurality of electronic control features such as computerized print array 20 controllers (not shown). In several aspects, the computerized print array 20 controllers are non-generalized, electronic control devices having a preprogrammed digital computer or processor (not shown), memory or non-transitory computer readable medium (not shown) used to store data such as control logic, instructions, image data, lookup tables, etc., and a plurality of input/output peripherals or ports (not shown). The processor is configured to execute the control logic or instructions, and generate outputs to the print array 20, and thereby the friction-disc 10. The controller may have additional processors or additional integrated circuits in communication with the processor, such as perception logic circuits for analyzing visual data relating to the friction-disc 10 or other such integrated circuitry.

The nozzles 22 may take a variety of forms depending on the particular application. In some examples, each of the nozzles 22 has a fixed size and generates a fixed spray pattern 23. In other examples, some or all of the nozzles 22 in a given print array 20 may have varying sizes and/or dynamically variable sizes and thereby generate a variety of different spray patterns 23. Additionally, in some examples the additives 24 supplied to the nozzles 22 of the print array 20 are pressurized to assist the print array in generating a predetermined spray pattern 23 with desirable characteristics for a given application.

In some aspects, the plurality of additives 24 impregnate and bond to the carbon fabric of the base layer 14, while in other aspects, the plurality of additives 24 remain substantially on a surface of the first and/or second fibers 16, 18 of the carbon fabric of the base layer 14. The plurality of additives 24 include resins 26, friction modifiers 28, and the like. In some aspects, the resins and friction modifiers 26, 28 are customized for and specific to a particular friction-disc 10 application. That is, the composition of each of the resins 26, and friction modifiers 28 varies depending on the application for which the friction-disc 10 is to be used. In some examples, the friction modifiers 28 include types of resin 26, particulates, and/or organic friction modifiers, or the like. In some examples, the resins 26 used at intersections between the first and second fibers 16, 18 have increased toughness or hardness. In one example, friction enhancing friction modifiers 28 are deposited at apex or reaction areas 30 having increased axial thickness "T". In another example, resins 26 having increased toughness or hardness are deposited by the print array 20 at areas of the base layer 14 where the first and second fibers 16, 18 cross over or under one another. That is, at areas of the base layer 14 where the first and second fibers 16, 18 intersect, there is a potential for the first and second fibers 16, 18 to move relative to one another. When the first and second fibers 16, 18 move relative to one another, there the first and second fibers 16, 18 can cause frictional wear on each other. Moreover, if the first and second fibers 16, 18 are movable relative to one another, the friction-disc 10 may decay and/or become damaged and therefore, become less effective. As a result, the print array 20 applies a resin 26 having increased toughness or hardness to both immobilize the first and second fibers 16, 18, relative to each other, and to provide additional strength and stability to the apex areas 30 of the base layer 14 of the friction disc 10. In combination, because apex areas 30 of the base layer 14 are formed by areas of intersection of the first and second fibers 16, 18, and because the apex areas 30 have an increased axial thickness "T", the apex areas 30 will come into contact with a pressure plate 32 before the rest of the base layer 14 during use. Therefore, it is desirable to provide the apex areas 30 with increased strength and a predetermined coefficient of friction so that the friction-disc 10 operates properly and according to design parameters. Moreover, a bond compliant resin 26 is used at the interface 34 between the base layer 14 and the base friction plate 12 to ensure a strong bond between the base layer 14 and the base friction plate 12. A strong bond between the base layer 14 and the base friction plate 12 is necessary in order to reduce the potential for friction-disc 10 failure due to loss or failure of the friction material of the base layer 14.

In several aspects, the print array 20 deposits the plurality of additives 24 at predetermined locations on the base layer 14. In some aspects, by adjusting the flow rate or speed, viscosity, and density of the plurality of additives 24, as well as a duration of deposition as the print array 20 operates, the manner in which the plurality of additives 24 is deposited on the base layer 14 can be dynamically adjusted. That is, the print array 20 dynamically deposits friction enhancing materials at the apex areas 30 while also depositing resins 26 having increased hardness at intersections of the first and second fibers 16, 18, and also depositing a bond compliant resin 26 at the interface 34 between the base layer 14 and the base friction plate 12.

In some applications, in order to improve the smoothness, gradualness, or progressiveness with which the friction-disc 10 engages with the pressure plate 32, a coefficient of friction that varies with the radius of the friction-disc 10 may be desirable. In some examples the transmission is an automatic transmission with a torque converter clutch, and the pressure plate 32 may be better described as a cover 32 having a reaction surface. In other examples the transmission may have a multi-plate clutch arrangement in either manual or automatic forms. However, each of the friction-discs 10 making up the multi-plate clutch arrangement may be constructed in substantially the same manner with substantially the same componentry as described herein without departing from the scope or intent of the present disclosure. In the example of FIGS. 1A-1C, the coefficient of friction can be managed by carefully depositing friction modifiers 28 at specific radial distances on the friction-disc 10. Thus, in the example of FIGS. 1A-1C, each of the plurality of additives 24 is applied to the base layer 14 in a two-dimensional operation. That is, the print array 20 operates as a high-density linear print mechanism, depositing a first friction modifier 28' in a customized quantity and composition to the apex areas 30 where the first fibers 16 of the woven carbon base layer 14 are disposed overtop the second fibers 18. Similarly, a customized quantity and type of a second friction modifier 28" or resin 26 is deposited to the apex areas 30 where the second fibers 18 of the woven carbon base layer 14 are disposed overtop the first fibers 16.

With specific reference to FIG. 10, the friction-disc 10 is shown as pressure is applied following the direction of arrow "E". As the amount of pressure is increased, thereby forcing the friction-disc 10 to contact the pressure plate 32, the woven carbon material of the base layer 14 warps. As the woven carbon base layer 14 warps, both the apices 30 of the first and second fibers 16, 18 progressively contact and interact with the pressure plate 32. In some examples, by progressively increasing a contact surface area between the friction-disc 10 and the pressure plate 32, a smooth and progressive engagement of the friction-disc 10 can be achieved.

Figures 2A, 2B:
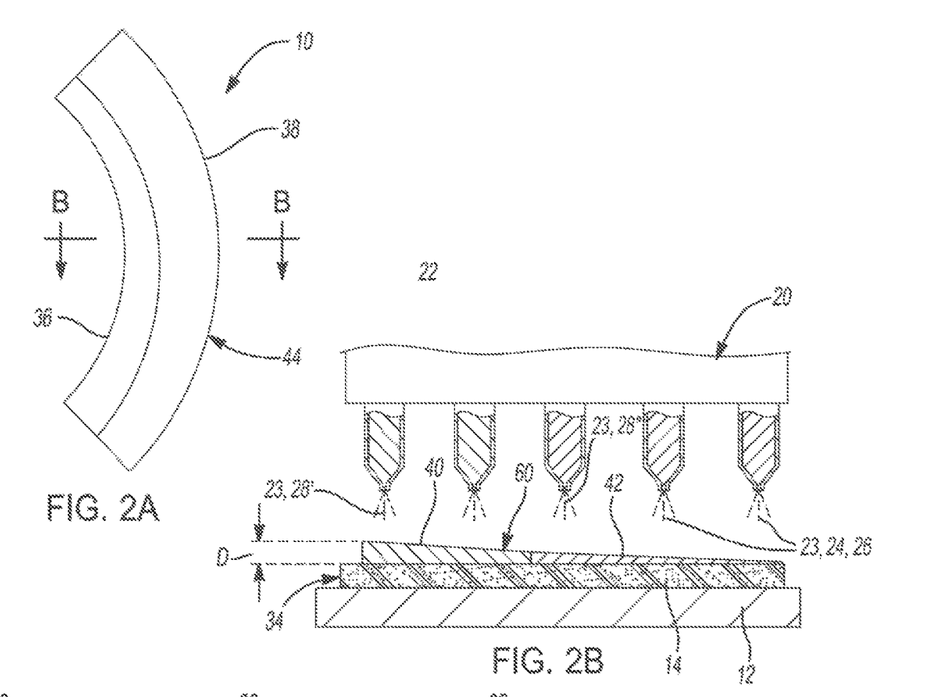
FIG. 2A is a plan view of a segment of another clutch disk manufactured according to an aspect of the present disclosure.
FIG. 2B is a cross sectional view of the segment of clutch disk of FIG. 2A taken across line B-B and shown during a manufacturing step of the method according to an aspect of the present disclosure.
Figure 2C:
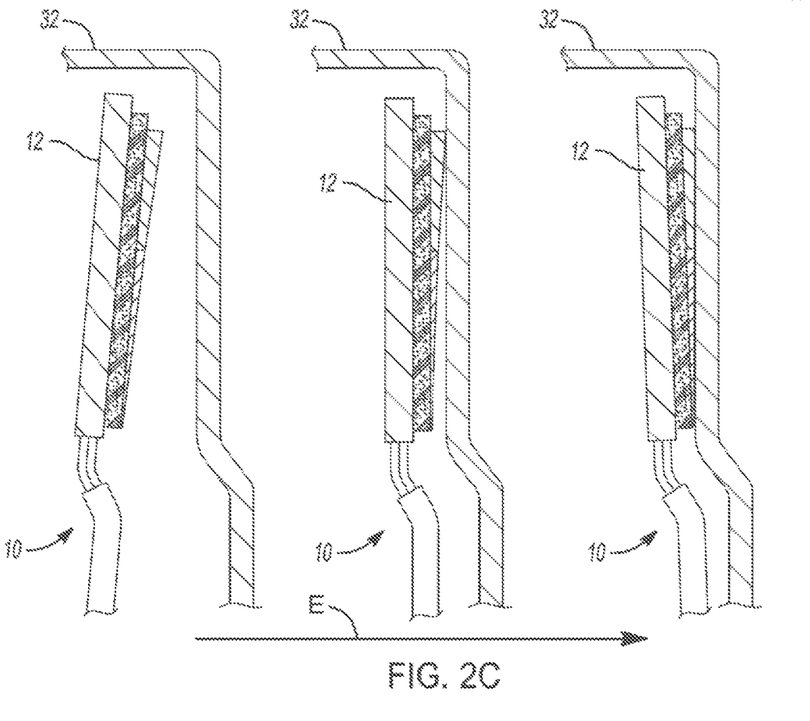
FIG. 2C is a partial cross sectional depiction of the clutch disk of FIG. 2A taken across line B-B and shown in use in a motor vehicle transmission according to an aspect of the present disclosure.

Turning to the example of FIGS. 2A-2C, each of the plurality of additives 24 is also applied to the base layer 14 in a two-dimensional operation. In the example of FIGS. 2A-2C, unlike the woven carbon base layer 14 of FIGS. 1A-1C, the base layer 14 is composed of a composite material. Depending on the application for which the friction-disc 10 is intended, a woven carbon base layer 14 is not required. As described previously, and as shown in FIG. 2C, in some aspects, the friction-disc 10 flexes under load. That is, as pressure is progressively applied to the friction-disc 10 along arrow "E", the substantially planar, annular friction-disc 10 deflects out of the substantially planar shape. Like the example of FIGS. 1A-1C, in order to improve the smoothness, gradualness, or progressiveness with which the friction-disc 10 engages with the pressure plate 32, a coefficient of friction that varies with the radius of the friction-disc 10 may be desirable. Therefore, the coefficient of friction can be managed by carefully depositing friction modifiers 28 at specific radial distances on the friction-disc 10. In the example of FIG. 2A-2C, the first friction modifier 28' is applied to an inner radial portion 36 of the friction-disc 10, while the second friction modifier 28" is deposited to an outer radial portion 38 of the friction-disc 10. Additionally, in order to aid the progressiveness with which the friction-disc 10 engages with the pressure plate 32, a thickness or depth "d" of the first and second friction modifiers 28', 28" is largest at an inner radius 40 of the friction-disc 10 and tapers to a minimum at an outer radius 42 of the friction-disc 10. That is, by including a tapering thickness or depth "d" of friction modifiers 28', 28", a gradually increasing small portion of the friction modifiers 28',28" may engage with the pressure plate 32 under circumstances were carefully modulated smooth engagement is desirable. Similarly, under more aggressive use, because the friction-disc 10 can flex under load, substantially the entire radial extent of the friction modifiers 28', 28" initially engages with the pressure plate 32 so that the friction-disc 10 and the pressure plate 32 abruptly engage and move with one another.

Figure 3A:
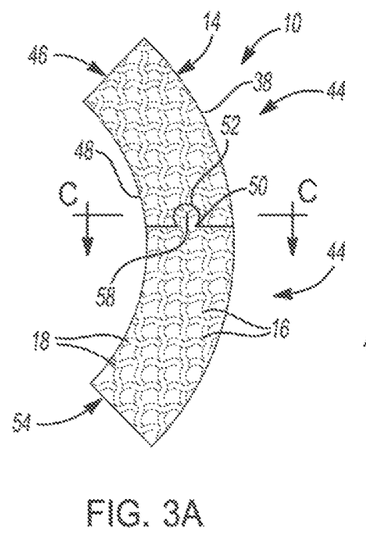
FIG. 3A is a plan view of a segment of another clutch disk manufactured with localized three dimensional ink according to an aspect of the present disclosure.
Figure 3B:
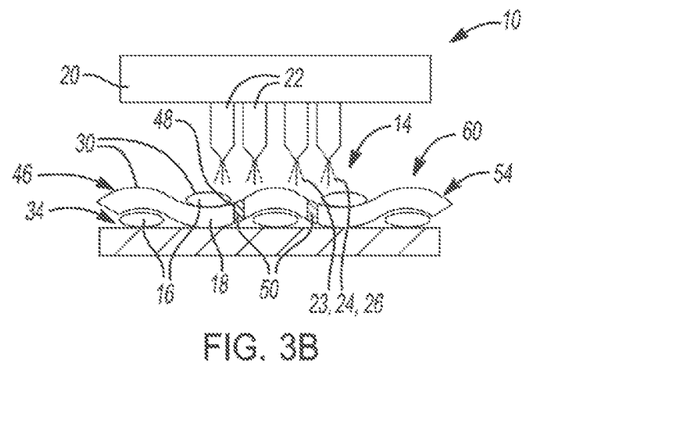
FIG. 3B is a cross sectional view of the segment of clutch disk of FIG. 3A taken across line C-C and shown during a manufacturing step of the method according to an aspect of the present disclosure.

In some circumstances, producing substantially planar, annular friction-discs 10 may not be feasible for material, cost, or other reasons. Thus, depending on the application, the production capabilities, cost limitations, and so forth, in some examples it is desirable to produce the friction-disc 10 by way of a series of interlocking arcuate segments 44. Turning now to FIGS. 3A and 3B, and with continuing reference to FIGS. 1A-2B, a third example of the friction-disc 10 is shown. Unlike the friction-discs 10 of FIGS. 1A-2B, the friction-disc 10 of FIGS. 3A and 3B is formed of a plurality of interlocking arcuate segments 44. Each of the plurality of interlocking arcuate segments 44 are composed of substantially the same structural components as described above with respect to FIGS. 1A-2B. That is, the interlocking arcuate segments 44 include a base friction plate 12 bonded to and supporting a base layer 14. Furthermore, in some examples, the base layer 14 is composed of a woven carbon material, while in other examples, the base layer 14 is composed of a composite material formed on or otherwise bonded to the base friction plate 12. In the example of FIG. 3A, a portion of a first arcuate segment 46 is shown, ending at a first end 48. The first end 48 includes a joint surface 50 with a receiving portion 52. A portion of a second arcuate segment 54 is also shown in FIG. 3A. The second arcuate segment 54 extends to a second end 56. Like the first end 48, the second end 56 includes a joint surface 50. However, the second end 56 also includes a protruding portion 58. The protruding portion 58 is shaped and sized to interlock and immovably engage with the receiving portion 52. In the example of FIG. 3A, the receiving portion 52 and the protruding portion 58 are shown as a substantially round lobate receptacle and protrusion, respectively. However, it should be appreciated that the receiving portion 52 and the protruding portion 58 may take other shapes such as finger joints, mortise and tenon joints, splice joints, tongue and groove joints, dovetail joints, or any other such interlocking and immobilizing joints without departing from the scope or intent of the present disclosure.

Aside from a mechanical joint between the first arcuate segment 46 and the second arcuate segment 54, the axial construction of the friction-disc 10 of FIGS. 3A and 3B is substantially similar to that of FIGS. 1A-2B. However, in some aspects, because multiple interlocking arcuate segments 44 make up the friction-disc 10 of FIGS. 3A and 3B, some additional structural reinforcement to the joint areas is desirable. To improve the structural strength, robustness, reliability, and longevity of the multi-part friction-disc 10, the print array 20 deposits a predetermined quantity of a structural resin 26 at or on the joint surfaces 50 of the first and second arcuate segments 46, 54. That is, each of the plurality of additives 24 is applied to the base layer 14 in a three-dimensional operation to ensure structural requirements for the friction-disc 10 are met. In some examples, the print array 20 also applies additional structural resin 26 along at least a portion of the inner radius and the outer radius 40, 42 of the friction-disc 10. More generally, the print array 20 deposits the plurality of additives 24 at predetermined locations on the base layer 14. By adjusting the flow rate or speed, viscosity, and density of the additives 24, as well as a duration of deposition as the print array 20 operates, the manner in which the additives 24 are locally deposited overtop the base layer 14 can be dynamically adjusted. In the example of FIGS. 3A and 3B, therefore, the dynamic adjustment of the flow of additives 24 through nozzles 22 of the print array 20 is adjusted to provide structural reinforcement to the joint surfaces 50 of the first and second arcuate segments 46, 54.

Figure 4A:
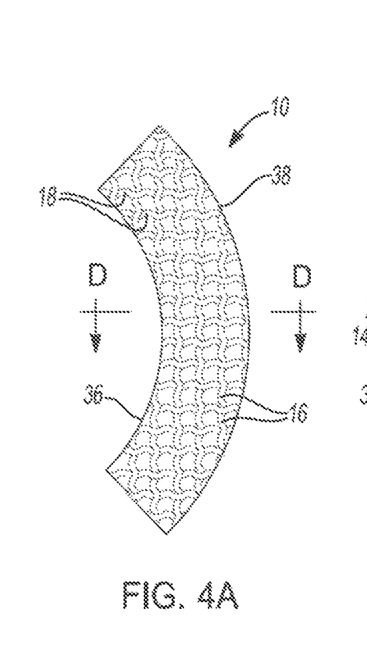
FIG. 4A is a plan view of a segment of another clutch disk manufactured with axial strength and friction modifications according to an aspect of the present disclosure.
Figure 4B:
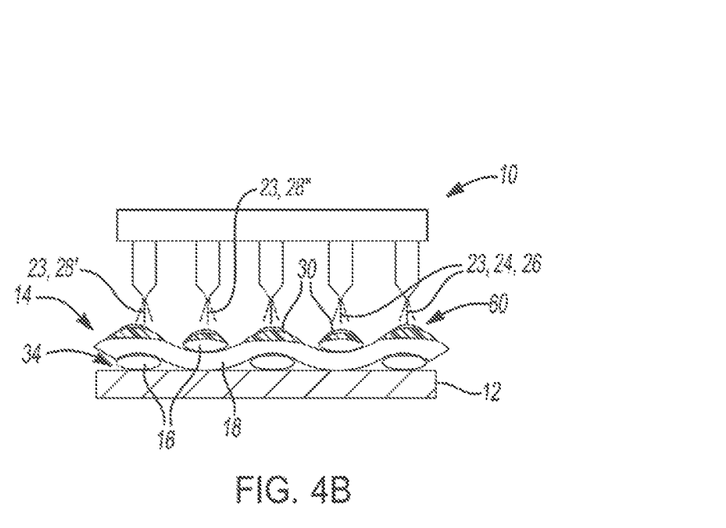
FIG. 4B is a cross sectional view of the segment of clutch disk of FIG. 4B taken across line D-D and shown during a manufacturing step of the method according to an aspect of the present disclosure.

Turning now to FIGS. 4A and 4B each of the plurality of additives 24 is also applied to the base layer 14 in a three-dimensional operation. That is, the plurality of additives 24 are deposited on and in some instances, axially impregnated into the base layer 14 by the print array 20. The axial deposition of the additives 24 provides latitude for strength and frictional modifications based on the use of additives 24 having differing viscosities. In an example, an additive 24 providing structural strength and rigidity to a woven carbon base layer 14 has a low viscosity. The low viscosity allows the additive 24 to wick into and deeply penetrate and impregnate the first and second fibers 16, 18 of the woven carbon material of the base layer 14. In another example, another additive 24 providing desirable frictional characteristics is deposited by the print array 20 on the woven carbon material of the base layer 14. In some aspects it is desirable to modify the frictional characteristics of the friction-disc 10 at or near a contact surface 60 where the apices 30 of the base layer 14 interact with and engage the pressure plate 32. Accordingly, the additive 24 providing desirable frictional characteristics has a relatively high viscosity in comparison with the prior example of the low viscosity additive 24 providing structural strength. The relatively high viscosity prevents the friction modifier 28 additive from wicking or seeping deeply into the first and second fibers 16, 18 of the base layer 14, thereby ensuring that the friction modifier 28 remains substantially at or near the apices 30 of the base layer 14 that form the contact surface 60.

Figure 5:
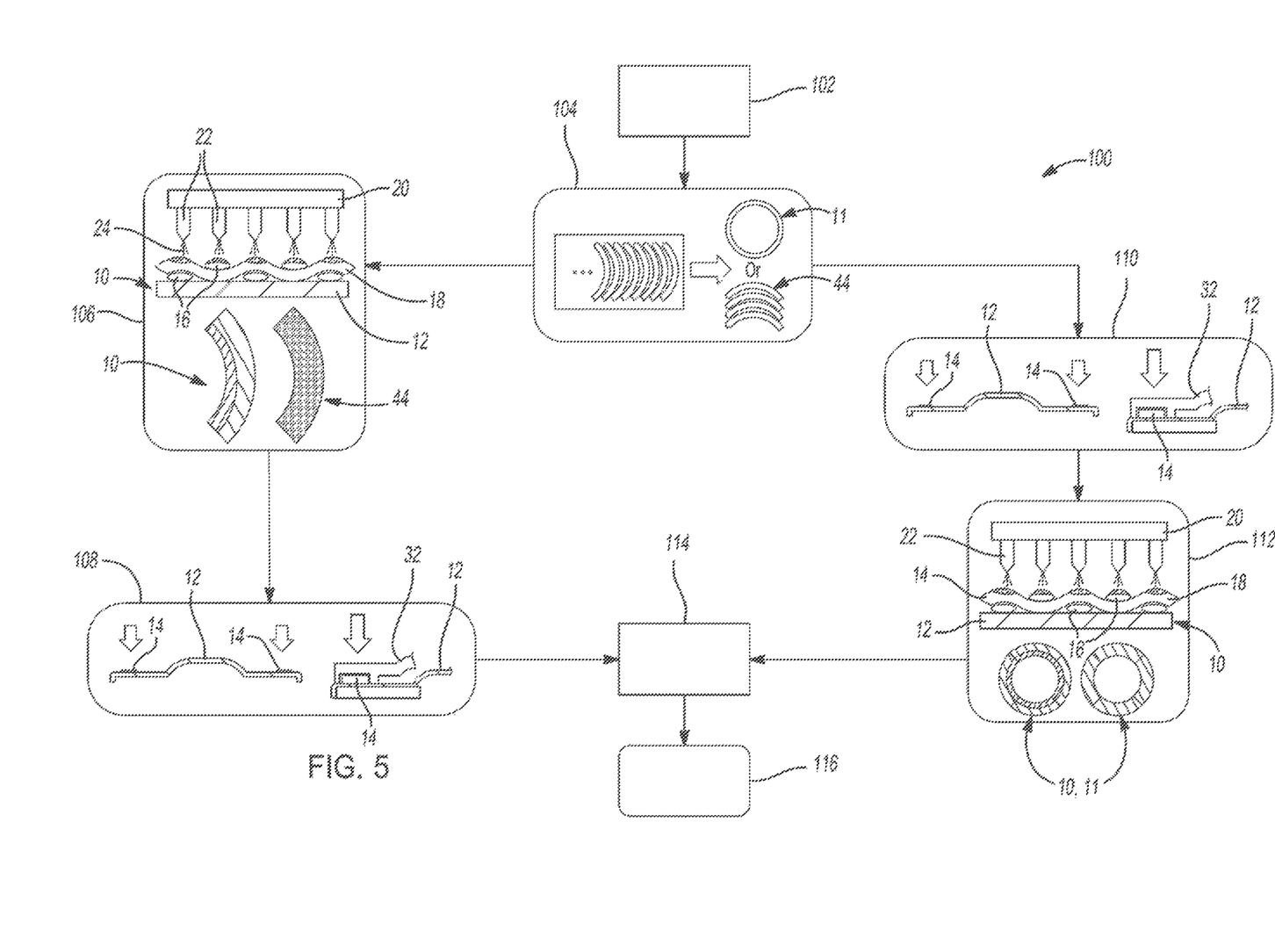
FIG. 5 is a flowchart depicting a method of producing a clutch disk according to an aspect of the present disclosure.

Turning now to FIG. 5 a method for manufacturing friction-discs 10 is shown and generally indicated by reference number 100. The method 100 begins at box 102 where a laminated friction-disc 10 material is received on a production line. The laminated friction-disc 10 material is generally provided in the form of long, continuous rolls or plates of stock material. In some aspects, an adhesive or bonding material is applied to the friction-disc 10 material in the raw stock material form. That is, an adhesive is applied to a core stock material made of a metallic or ceramic material, such as a steel plate material. At block 104, the laminated friction disc 10 material is fed into a cutting tool or machine. In some examples, the cutting tool is a machine such as a press, a die cutting machine, or the like. In some examples, the laminated friction disc 10 material is cut into substantially planar annular discs 11. In other examples, the laminated friction-disc 10 material is cut into a plurality of arcuate segments 44 having interlocking features. Depending on the application, the production requirements and capabilities, and on other factors, at block 106 the laminated friction disc 10 material is then placed into the print array 20 and a plurality of additives 24 are thereafter deposited onto the friction-disc 10 or arcuate segments of the friction-disc 10. In some examples, the print array 20 operates substantially as a high density linear print mechanism. That is, the print array 20 moves linearly across the friction-disc 10 depositing the additives 24 on the friction-disc 10 while the friction-disc 10 is moved in a linear fashion past and perpendicular to the motion of the print array 20. In some aspects, when the array 20 operates as a high density linear print mechanism, the movements of the print array 20 and the friction-disc 10 are similar to the movements of a print head and a piece of paper through an inkjet printer, respectively. In other examples, the print array 20 operates as a translational printer. That is, the print array 20 moves over the friction-disc 10 in all directions while the friction-disc 10 is held stationary. In several aspects, when the print array 20 operates as a translational printer, the movements of the print array 20 are similar to those of a 3-D printer. Once the plurality of additives 24 have been deposited on the friction-disc 10 at block 108 the substantially planar annular friction-discs 10 or the arcuate segments 44 of the friction-discs 10 are loaded onto and bonded to the base friction plate 12. However, in some examples, as shown at block 110 it is preferable load and bond the substantially planar annular friction-discs 10 or the arcuate segments 44 of the friction-discs 10 to the base friction plate 12 prior to modifying the frictional and structural characteristics of the base layer 14 of the friction-disc 10. At block 112, once the friction-discs 10 have been assembled to the base friction plate 12, the entire friction-disc 10 is loaded into the print array 20 as a unit and the plurality of additives 24 are thereafter deposited on the base layer 14 of the friction-disc 10. Once the friction-discs 10 have been loaded, bonded, and the plurality of additives 24 have been applied, the method 100 proceeds from blocks 108 and/or 112 to block 114 where the friction-discs 10 are assembled with other transmission components within a transmission case (not shown) for use in a motor vehicle. At block 116 the method 100 ends.

A system and method for producing an automotive friction material with optimized multi-dimensional construction of the present disclosure offers several advantages. These include improved performance, better control of distribution of raw materials used during friction material manufacturing, and optimization of friction performance and internal structural strength, while decreasing manufacturing obstacles and maintaining or reducing costs. The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automotive friction material with multi-dimensional construction, the automotive friction material comprising:
   a base friction plate;
   a friction-disc base layer bonded to and supported by the base friction plate, the friction-disc base layer comprising first fibers interwoven with second fibers, wherein overlap between the first fibers and the second fibers defines apex areas; and a hardness resin disposed only on the apex areas, the hardness resin configured to increase hardness relative to the first fibers and second fibers.

2. The automotive friction material of claim 1 wherein the friction-disc base layer comprises portions of a continuous roll or flattened stock material.

3. The automotive friction material of claim 1 wherein the friction-disc base layer comprises a first arcuate segment interlocked with a second arcuate segment.

4. The automotive friction material of claim 1 wherein the base friction plate comprises a rigid metal, and the friction-disc base layer comprises fibrous materials, carbon materials, or composite materials.

5. The automotive friction material of claim 3, further comprising a structural resin disposed at a joint surface between the first arcuate segment and the second arcuate segment thereby bonding the first arcuate segment to the second arcuate segment, wherein the structural resin is different from the hardness resin.

6. The automotive friction material of claim 5 wherein the hardness resin structurally reinforces and stabilizes the fibers relative to one another, and wherein the structural resin structurally reinforces, bonds, and stabilizes the interlocking arcuate segments relative to one another.

7. The automotive friction material of claim 1 further comprising:
a bonding resin disposed between the base friction plate and the friction-disc base layer and bonding the friction-disc base layer to the base friction plate.

8. The automotive friction material of claim 1 wherein the hardness resin comprises a first hardness resin having a first friction modifier and a second hardness resin having a second friction modifier, and wherein the first hardness resin is disposed at the apex areas where the first fibers are disposed overtop the second fibers relative to the base friction plate, and the second hardness resin is disposed at the apex areas where the second fibers are disposed overtop the first fibers relative to the base friction plate.

9. The automotive friction material of claim 1 wherein a coefficient of friction of the friction-disc base layer varies in relation to a radius of the friction-disc base layer, and wherein the coefficient of friction depends on location of deposition of the hardness resin on the friction-disc base layer.

10. An automotive friction material with multi-dimensional construction, the automotive friction material comprising:
a base friction plate;
a friction-disc base layer bonded to and supported by the base friction plate, the friction-disc base layer comprising woven fibrous materials, carbon materials, or a composite material formed as an annular ring having an inner radial portion and an outer radial portion;
a bonding resin disposed between the base plate and the friction-disc base layer and bonding the friction-disc base layer to the base friction plate;
a first friction modifier disposed over the friction-disc base layer within the inner radial portion; and
a second friction modifier disposed over the friction-disc base layer within the outer radial portion, and
wherein a thickness of the first friction modifier and the second friction modifier is largest at an inner radius of the friction-disc base layer and smallest at an outer radius of the friction-disc base layer.

11. The automotive friction material of claim 10, wherein the thickness of the first friction modifier and the second friction modifier tapers continuously from the inner radius to the outer radius.

12. A system for producing an automotive friction material with optimized multi-dimensional construction, the system comprising:
an automotive friction material comprising:
a base friction plate;
a friction-disc base layer bonded to and supported by the base friction plate, the friction-disc base layer comprising first fibers interwoven with second fibers, wherein overlap between the first fibers and the second fibers defines apex areas; and
a hardness resin disposed only on the apex areas, the hardness resin configured to increase hardness relative to the first fibers and second fibers;
a multi-nozzle printing array;
a pump in fluid communication with the multi-nozzle printing array;
a computerized print array controller in electronic communication with the pump and the multi-nozzle printing array;
the computerized print array controller executing control logic or instructions generating outputs to the multi-nozzle printing array and the pump to produce the automotive friction material, wherein the control logic includes:
a first control logic for cutting a friction-disc material into segments each having a predetermined size and shape;
a second control logic for assembling the segments into the friction-disc base layer;
a third control logic for bonding the friction-disc base layer, made of the segments, to the base friction plate; and
a fourth control logic for utilizing the multi-nozzle printing array to deposit the hardness resin overtop the apex areas.

* * * * *